United States Patent [19]
Wulff

[11] Patent Number: 5,127,183
[45] Date of Patent: Jul. 7, 1992

[54] FISHING FLY

[76] Inventor: Lee Wulff, Beaverkill Rd., Lew Beach, N.Y. 12753

[21] Appl. No.: 666,147

[22] Filed: Mar. 7, 1991

[51] Int. Cl.$^5$ ............................................. A01K 85/00
[52] U.S. Cl. .................................. 43/42.25; 43/42.28; 43/42.39
[58] Field of Search ................. 43/42.25, 42.28, 42.39; D22/128

[56] References Cited

U.S. PATENT DOCUMENTS

| | | | |
|---|---|---|---|
| 1,953,692 | 4/1934 | Shoff | 43/42.25 |
| 2,306,005 | 12/1942 | Thomas | 43/42.28 |
| 2,575,248 | 11/1951 | Clark | D22/128 X |
| 3,590,514 | 7/1971 | Begley | 43/42.39 X |
| 3,821,862 | 7/1974 | Teeny | 43/42.25 |
| 4,411,089 | 10/1983 | Runeric | 43/42.25 X |
| 4,559,736 | 12/1985 | Sienkiewicz | 43/42.25 |

Primary Examiner—Richard K. Seidel
Assistant Examiner—Patty E. Hong
Attorney, Agent, or Firm—Handal & Morofsky

[57] ABSTRACT

A fly-fishing lure which comprises a hook comprising a shank, with an eyelet at one end of the shank portion and a curved portion at the other end of the shank portion is disclosed. The curved portion terminates at the end of the hook opposite the eyelet in a point. An elongated member is attached to the end of the shank portion opposite the eyelet. The elongated member extends from the shank portion and a soft body facade is secured around the elongated member. The elongated member is longer than the shank portion.

18 Claims, 5 Drawing Sheets

FISHING FLY

TECHNICAL FIELD

The present invention relates to fishing lures of the type used in fly fishing and, in particular, to a fly particularly useful for trout fishing.

BACKGROUND

Fishing, as a means of sustenance, goes back far beyond the earliest beginnings of civilization and, indeed, predates modern homo sapiens, as numerous archaeological finds have revealed.

Perhaps the earliest form of fishing practiced by man involved the use of a spear or similar instrument which was used to take the fish after the same was visually spotted. Other means for catching fish have also been used since time immemorial. For example, hooks are revealed in the archeological record for many thousands of years in such diverse areas as the pan-arctic culture, Europe and China.

Hooks also represent the first use of what may be generally referred to as baits and lures. Typically, hooks were and still are baited using a food which the species being sought is likely to feed on. For example, such species as flounder and porgies may be taken using saltwater worms, such as sand worms, minnows, or the like. Larger species, such as tautogs may also take a worm but are also likely to be taken on crabs Larger species such as mature bluefish and striped bass typically feed on large schools of menhaden and a typical means of catching these larger fish involves the use of large chunks of menhaden on a hook or, whole fish attached to a line by a hook. Naturally, the use of live bait is generally regarded as more efficacious than other alternatives.

In addition to the natural foods of the species being sought, other materials will also serve as baits. For example, trout are often caught using corn kernels. Catfish and other species often will take a hook baited with a wheat flour dough. Some fishermen believe that making the dough using fish oil, alcohol or other additives improves the appeal of this material as a bait. Still another approach involves the use of such other additives as fluorescent coloring agents in a wide range of colors, although this could be questioned due to the limited range of sensitivity of fish eyes to light across the spectrum.

Still yet another technique involves the use of so-called artificial lures which simulate the bait. For example, in the case of bluefish, striped bass and other larger species, the same may be lured through the use of a simulated mechanical minnow or larger bait fish. The lure may be as simple as an elongated hook bearing rounded cylindrical plug which is pulled through the water either by casting and retrieving or by being trolled behind a moving boat under motor, sail, or human power. More elaborate versions have varying degrees of buoyancy and, or a forward located fin which causes them to dive and wiggle to the right and left as they are pulled through the water. Still others have concave or flat front ends of "heads". These heads have the effect of causing the plug to make a noise as it is dragged through the water. The attractiveness of this effect may be enhanced by irregular retrieval of the plug.

The commercial availability of plugs is only a relatively recent phenomenon because of the traditional nature of fishing, despite the fact that these devices have a surprisingly long history. The best evidence is that the use of these devices originated with American Indians in aboriginal times, well before the introduction of Europeans into the Americas. It was only about a century ago that plugs were first manufactured and sold for eventual widespread use by fisherman in North America.

Fisherman have also developed the art of fishing using simulations of other live baits. At some point, long ago, fisherman noticed that the trout and other fish which they were seeking often fed on flies and other insects which were either trapped by or were emerging from pools of water in the streams and ponds where the fish lived. While, it is likely that from the earliest times flies, larvae, nymphs and other insects were used as bait, from a very early date simulations of these creatures also were used to catch fish.

One entire branch of fishing evolved from this approach. Fly fishing, as the sport is known today, evolved from the use of artificial flies as lures to catch primarily fresh water fish species.

While the precise origins of the sport are not known, it had progressed from its earliest beginnings to a point where, in the Middle Ages, written descriptions were available for the composition and construction of flies from such materials as hair, fur, feathers, wire and yarn, virtually the same materials in use today. Likewise, detailed instructions were available for the composition of lines and the various characteristics of the lines and flies which were needed to catch particular species of fish.

Moreover, the activity of fly fishing had developed to the point that even in the Middle Ages the same was recognized as a sport which was suitable for gentlemen to use to occupy their leisure time. At the same time, at least one treatise admonishes gentlemen fly fisherman not to abuse the sporting nature of this diversion by doing such things as taking more fish than one actually consumes oneself and not to interfere with those who make their living from the waters, among other things.

At the same time, it is noted that during this early period, such fresh water fishing was often reserved to the nobility which controlled the rivers, streams, lakes and ponds where trout and salmon could be taken. During this period, only trout and salmon were considered suitable as food for gentle folk, other fish being referred to as "coarse" fish.

The flies used during the Middle Ages and, for that matter, the flies used until relatively recently all fall into a category generally referred to today as wet flies. Such flies comprise a hook whose shank serves to simulate the body of the fly. The body can be formed by wrapping or otherwise covering the shank with yarn. Wings can be simulated with tufts of fur. Wings can also be simulated with bits of feather cut to the proper size and shape. In addition, a tail may be added to the "fly" at the end of the shank opposite the eye by which it is attached to the line. Such a tail may be made of a tuft of fur or textile. Generally, during use, wet flies sink below the surface of the water and are typically cast and retrieved at relatively low speed or allowed to move in a current at the end of a fly line and the relatively flexible fly rod.

During casting, the fly rod is swung backward and forward resulting in casting forward and casting back increasing lengths of the whip-like fly line forward and back against the spring action of the fly rod, dragging the almost weightless lure at its tip.

While most of the changes in the equipment used for fly fishing have been limited to the introduction of more modern materials, such as the evolution from willow to heartwood and later split bamboo, fiberglass and graphite as rod materials, the only major change in the sport occurred about a hundred years ago with the introduction of the dry fly. Generally, this sort of fly is designed to be extremely light so that it may float on water as a consequence of surface tension. Floating is achieved through the use of a flotation coating on the fly, such as petroleum jelly or the like and particular constructional features, including, the spiralling of hackle about the body of the fly to produce numerous points which, particularly when coated with floatant, enhance the ability of the relatively light fly to rest on the top of the water.

SUMMARY OF THE INVENTION

Despite the fact that fly fishing equipment and patterns have evolved over the centuries into what are believed to be very effective means for taking fish, certain inadequacies in flies still exist. For example, the simulated body of the fly is relatively hard, insofar as it comprises the shank of the hook. While the body provides an attractive lure, once taken, the natural tendency of the fish is to eject the fly. As a consequence, fishermen have evolved patterns which use relatively large hooks which are harder to eject. The use of relatively large hooks also increases the likelihood that the fish will attempt to spit the fly. Nevertheless, this approach does work to make a very efficient lure.

However, even when the fish is hooked, problems remain. In particular, the use of a large hook results in a relatively great amount of leverage between the point at which the hook has entered the fish and the point on the hook at which the line is attached. The result is that as the fish is brought in by the winding of the line on the reel the relatively strong forces involved acting over the lever arm of the hook shank will often result in opening up the flesh at the entry point, dislodging of the hook and loss of the fish.

More importantly, given the current level of interest in catch and release and the importance of maintaining fish as a sporting resource, the damage caused in such cases is still high. Even if the hook is not ripped from the mouth of the fish during an attempted but unsuccessful retrieval, release of a fish hooked with a large hook does not necessarily result in survival of that fish.

The invention, as claimed, is intended to provide a remedy. It solves the problem of increasing the likelihood of hooking the fish while decreasing the likelihood of fish loss. At the same time, damage to the fish is minimized. This is achieved using a fly-fishing fly, comprising a conventional hook having a shank, and an eyelet at one end of the shank. The curved portion at the other end of the hook opposite the shank terminates in a point. An elongated member attached to the end of the shank is opposite the eyelet. The elongated member extends from the shank. A body facade is secured around the elongate member. The elongated member is longer than the shank portion and is flexible and elastic in accordance with the preferred embodiment.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
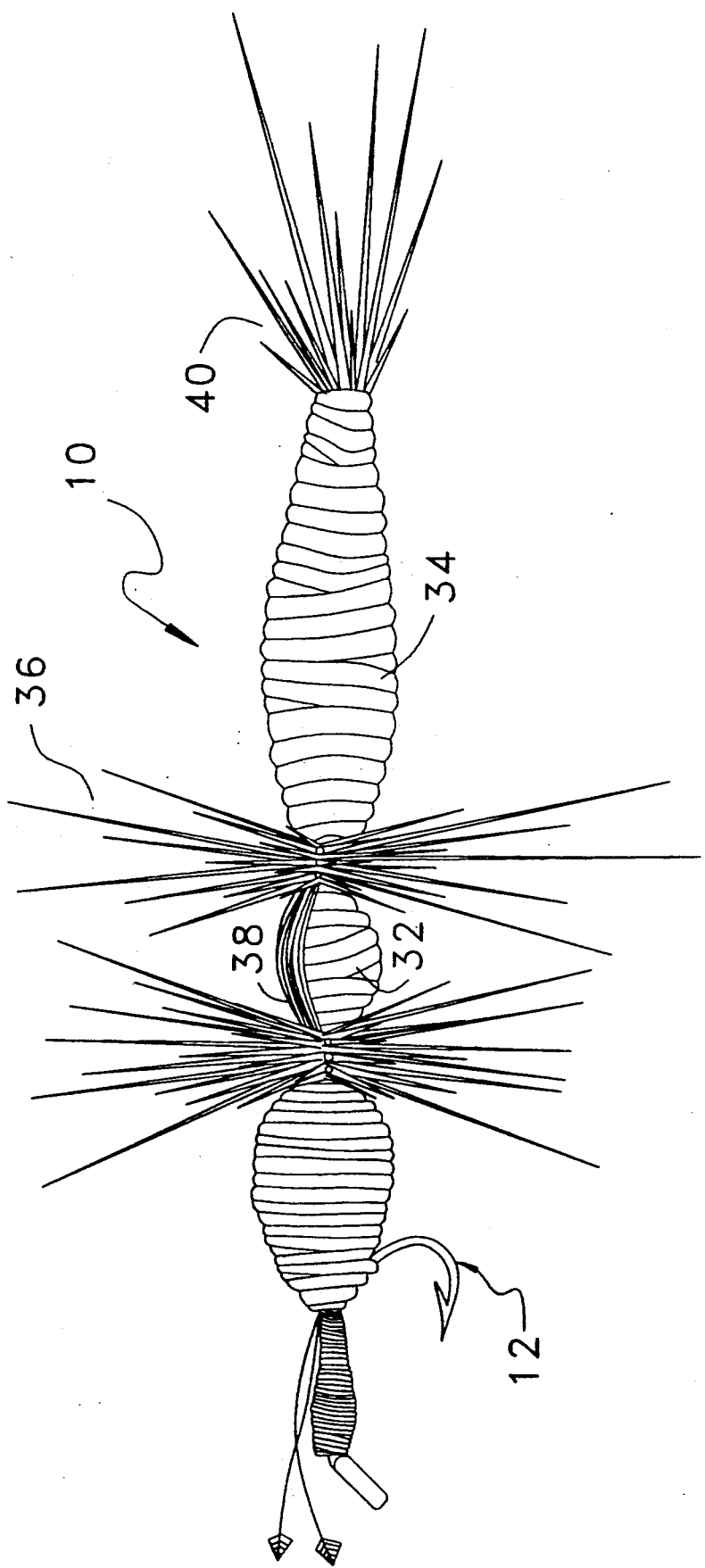
FIG. 1 is a greatly enlarged side view of a fly constructed in accordance with the invention.

Referring to FIG. 1, the inventive fly 10 is illustrated. The inventive fly includes a hook 12 of exceedingly small size, for example, a size 16 hook, as illustrated in FIG. 1. However, the inventive construction is applicable to hooks of larger as well as substantially smaller size, for example, a size 28 hook. As can be seen in FIG. 1, the inventive hook is of sufficiently small size that it is substantially forward of the visual center of gravity of the inventive fly 10.

Figure 2:
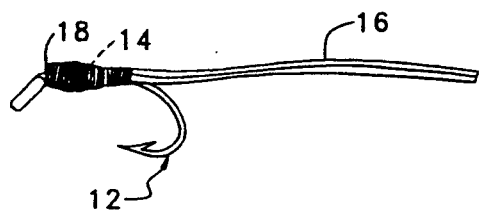
FIG. 2-4 show successive steps in the assembly of the fly of FIG. 1.

Construction of the inventive fly is illustrated in FIG. 2. More particularly, construction is begun by winding a thread around the shank 14 of the hook. The thread is the glued or lacquered to the hook shank in order to provide a firm foundation for the remaining parts in the construction. After thread has been wound around the shank of the hook, one then takes a length of pliable material, for example, a length of tubing 16 which is preferably made of a hollow pliable plastic material such as polyvinyl-chloride plastic and has a dimension in the illustrated example of approximately 0.12 cm. One continues winding the thread which was wound around the hook around tubing 16 until a quantity of thread 18 is wrapped around the shank 14 of hook 12 resulting in firmly securing the tubing 16 to hook 12. This part of the construction is then secured using lacquer, glue or other suitable adhesive material. The resulting construction is illustrated in FIG. 2.

Figure 3:
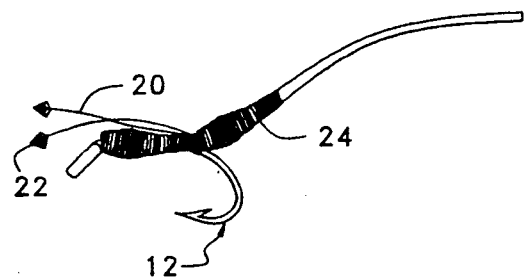

This construction may then be used to build up any number of different flies. For example, as illustrated in FIG. 3, one may attach a pair of antennae 20 and 22 using thread 24 which is wrapped around tubing 16.

Figure 4:
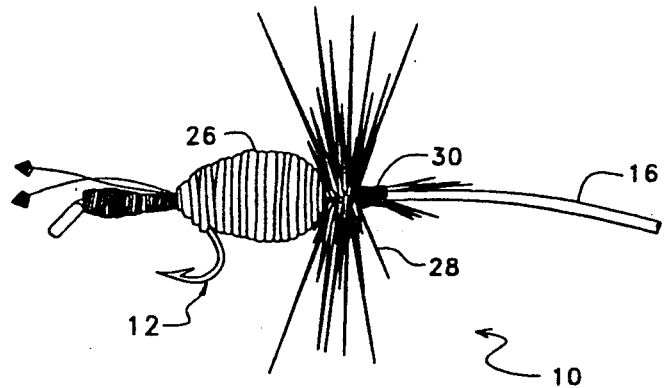

Subsequently, the construction may be continued by winding a quantity of wool 26 around tubing 16 as illustrated in FIG. 4. This ma then be followed by the winding of a hackle feather 28 around the base of the wound wool 26. Hackle 28 may be secured using a quantity of thread 30 wound to its base.

The construction of fly 10 may then be completed by the winding of additional wool, for example, of a different color, into a pair of simulated body portions 32 and 34 and additional hackle 36 as illustrated in FIG. 1. Additional detail may be provided by a tuft of hair 38 and a tail hair tuft 40 to complete the inventive fly 10.

Figure 5:
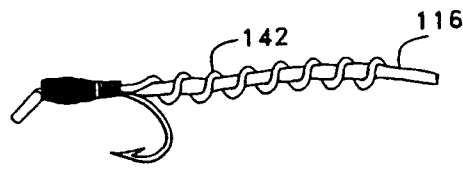
FIG. 5 illustrates a weighted fly base.

An alternative embodiment is illustrated in FIG. 5. Generally, similar parts or parts performing analogous, corresponding or identical functions to those of the FIG. 1 embodiment are numbered herein with numbers which differ from those of the earlier embodiment by multiples of on hundred.

If one wishes to make a fly with some additional weight, one may add weight to a base of the type illustrated in FIG. 2 by winding a portion of lead wire 142 around tubing 116, as illustrated in FIG. 5.

However, one of the primary advantages of the present invention is the extremely low weight of the inventive fly. Thus, the inventive fly is of particular value in the manufacture of saltwater lures. Such lures have traditionally been quite heavy, commonly using size 1 or size 1/0 hooks. In the case of larger fish, hooks as large as size 5/0 are commonly used. Such large hooks are needed because the same are used to simulate the body of the relatively large minnows to which the large saltwater fish are attracted. Typically, such hooks are very difficult to cast with a fly rod and a high degree of effort and skill is required to cast the same.

Figure 6:
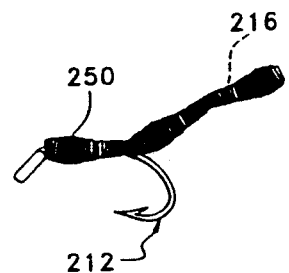
FIG. 6 illustrates a step in the construction of a saltwater fly.
Figure 7:
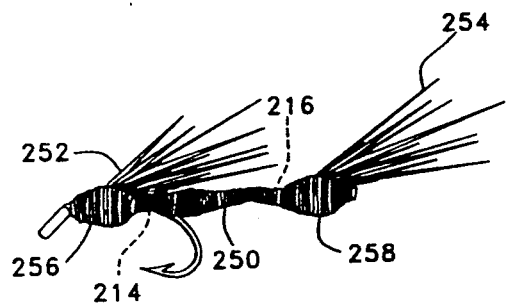
FIG. 7 illustrates the finished saltwater fly.

In accordance with the present invention, it is possible to fabricate a saltwater fly hook using a hook of very small size. In the example, as illustrated in FIG. 6, a number 14 hook 212 is used to form the body of a saltwater fly. Generally, the hook has a piece of tubing 216 secured to it in the manner of the embodiment of FIG. 2. This body is then made somewhat thicker by being wound with wool or by having a quantity of featherbase material secured thereto by a combination of glue and thread. This body is then wound with a quantity of reflective material 250 to form a reflective lure body. The lure is then completed, as illustrated in FIG. 7 by attaching a pair of bucktail hair tufts 252 and 254 using quantities of thread 256 and 258 which are wound around the shank 214 of the hook and the tail of tubing 216, respectively, as illustrated in FIG. 7. The resultant saltwater fly is of identical appearance to that of traditional saltwater flies, yet is extremely light and easy to cast. This fly is also of particular advantage to fishermen who do not regularly practice the sport and who thus may not have the stamina or strength to cast traditional heavy saltwater tackle for any length of time.

Figure 8:
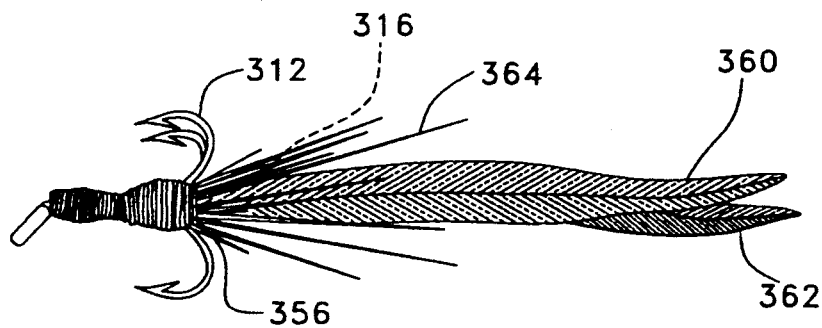
FIG. 8 illustrates a treble hook saltwater fly.

Yet another embodiment of the present invention particularly useful for saltwater fishing is illustrated in FIG. 8. Here a size 10 treble hook 312 is provided with a length of tubing such as length 216 in FIG. 6 and then covered with a silvery reflective material to simulate a minnow body's shine. A so-called "Deceiver" pattern is then mounted on the tubing 316 by tying several inwardly facing feathers to tubing 316 using thread 356 and using a quantity of glue or other appropriate cement to secure the feathers in place. The feathers 360 and 362 are then covered with bucktail hairs 364 which extend around the base of the feathers, are secured to the base and hook and thus maintain them straight. In particular, these bucktail feathers are glued at the base of the feathers and also secured in the position illustrated in FIG. 8 by thread 356. Other aspects of the standard Deceiver pattern, such as a portion of dark hair at one point along the circumference of the bucktail hairs 356 may be used. Likewise, flashing material may be added at a traditional point in the pattern.

Figure 9:
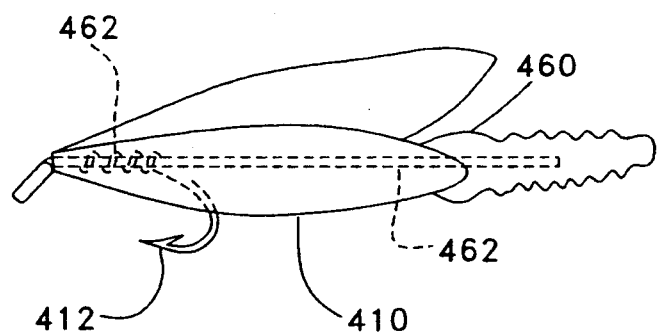
FIG. 9 illustrates a rubbery bodied fly.
Figure 10:
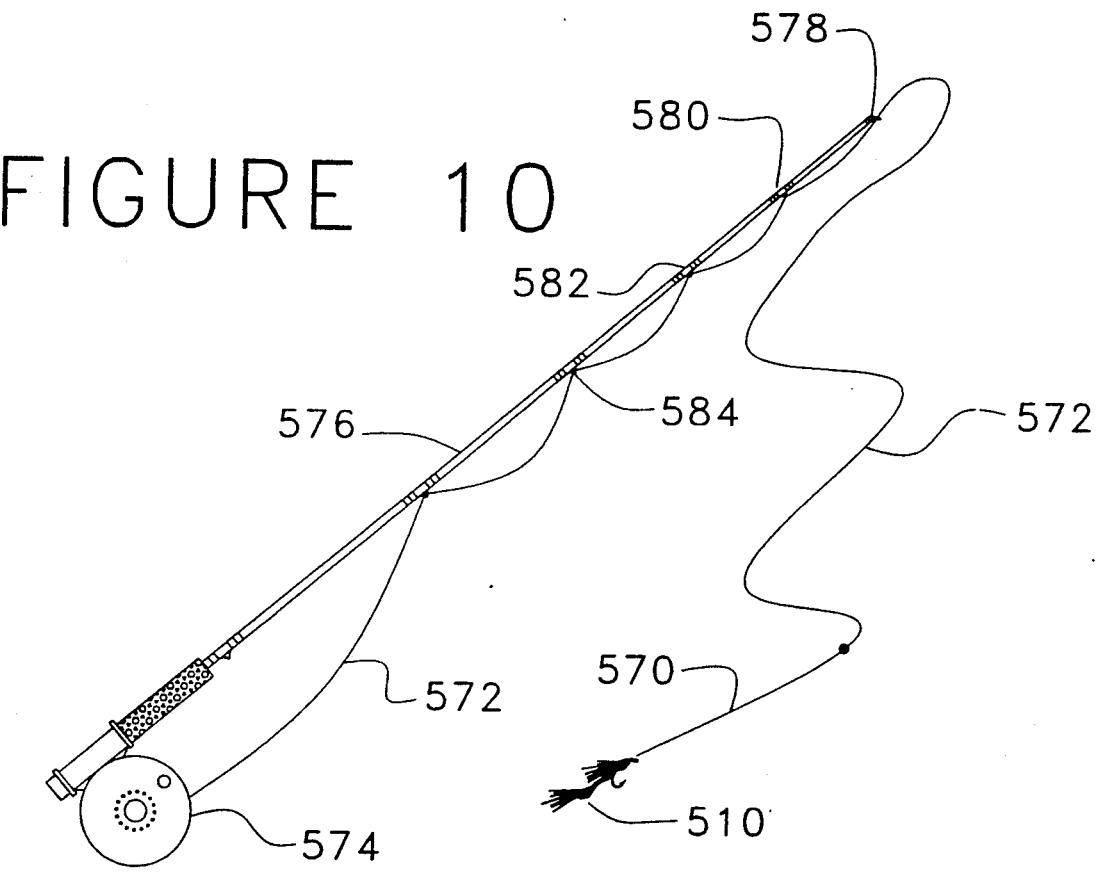
FIG. 10 is an illustration of a fly fishing outfit constructed in accordance with the invention.

Still yet another embodiment is illustrated in FIG. 9. Here a fly 410 comprises a hook 412 embedded in a soft rubbery plastic artificial fly body 460 which is flexible, elastic and compressibly resilient. The construction may be reinforced by an internal reinforcement member 462 made of nylon monofilament or thin, strong metallic wire, which is wound around and secured to hook 412.

In use, one of flies 510 illustrated in FIGS. 1-9 is attached to a leader 570 which in turn is connected to a fly line 572. A backer (not illustrated) is wound on reel 574 with the end of the backer attached to the fly line 572. In conventional fashion, a fly rod 576 has reel 574 mounted thereon and the line threaded through the eyelets 578-84. In accordance with the invention, a relatively light (e.g. 5-7 weight) outfit may be used to take many saltwater species.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A fly-fishing lure assembly comprising a lure attached to a fly line, said lure comprising a hard hook, said hook comprising a shank portion, an eyelet at one end of said shank portion and a curved portion at the other end of said shank portion, said curved portion terminating at the end of said hook, opposite said eyelet, in a point, a flexible elongated member attached to the end of said shank portion opposite said eyelet, said elongated member extending from said shank portion, and a body facade secured around portions of said elongated member extending from said shank portion, said elongated member being longer than said shank portion, said portion of said body facade secured around said extending portions of said elongated member being flexible, whereby an extended period of time elapses before said hard hook is detected by a fish.

2. A lure as in claim 1, wherein said elongated member is substantially longer than said shank portion.

3. A lure as in claim 1, wherein said elongated member is flexible.

4. A lure as in claim 1, wherein said elongated member is elastic.

5. A lure as in claim 1, wherein said elongated member is flexible and elastic.

6. A lure as in claim 1, wherein said elongated member is bendable.

7. A lure as in claim 1, wherein said elongated member is substantially longer than said shank portion of said hook and said hook is a size 14 or smaller hook.

8. A lure as in claim 1, wherein the shank portion of said hook is contained within said facade.

9. A fly-fishing lure, comprising a hook, said hook comprising a shank portion, an eyelet at one end of said shank portion and a curved portion at the other end of said shank portion, said curved portion terminating at the end of said hook, opposite said eyelet, in a point, an elongated member attached to the end of said shank portion opposite said eyelet, said elongated member extending from said shank portion, and a body facade secured around said elongated member, said elongated member being longer than said shank portion, wherein said elongated member comprises a heavy bendable material.

10. A lure as in claim 9, wherein said heavy material is lead.

11. A fly-fishing fly assembly comprising a fly attached to a fly line, said fly comprising a hook, said hook comprising a shank portion, an eyelet at one end of said shank portion and a curved portion at the other end of said shank portion, said curved portion terminating at the end of said hook, opposite said eyelet, in a point, an elongated member attached to the end of said shank portion opposite said eyelet, said elongated member extending from said shank portion, said elongated member and said shank portion forming a backbone support and a simulated bait body, at least a portion of said bait body being secured along the length of a portion of said elongated member extending from said shank portion, said portion of said bait body not including a hook, whereby said assembly may be worked to hook a fish in a relatively long period of time before said hook is detected by said fish.

12. A fly as in claim 11, wherein said elongated member is flexible, whereby said simulated bait body is at least in part flexible.

13. A fly as in claim 12, wherein said simulated bait body extends around and envelopes said backbone.

14. A fly as in claim 13, wherein said simulated bait body is substantially longer than said shank portion and said bait body simulates only a single living creature.

15. A fly as in claim 12, wherein said elongated member comprises a heavy bendable material.

16. A fly as in claim 12, wherein said simulated bait body comprises fibrous materials.

17. A fly as in claim 12, wherein said simulated bait body comprises a lightweight material with air spaces incorporated therein.

18. A fly as in claim 17, wherein said simulated bait body comprises a yarn or thread member secured around said shank portion and said elongated member, and glued to said shank portion; and an outer sheathing material secured to said thread or said yarn member a reinforcement member disposed therein and secured to the hook found by said shank portion, said curved portion and said eyelet.

* * * * *